No. 613,546. Patented Nov. 1, 1898.
W. B. WRIGHT.
GATE OPERATING AND SECURING DEVICE.
(Application filed Apr. 27, 1897.)

(No Model.) 2 Sheets—Sheet 1.

WITNESSES
H. N. Jenkins
W. J. Wetmore

INVENTOR
Wm. B. Wright
By Stoddart & Co.
Attorneys

THE NORRIS PETERS CO., PHOTO-LITHO., WASHINGTON, D. C.

No. 613,546. Patented Nov. 1, 1898.
W. B. WRIGHT.
GATE OPERATING AND SECURING DEVICE.
(Application filed Apr. 27, 1897.)
(No Model.) 2 Sheets—Sheet 2.
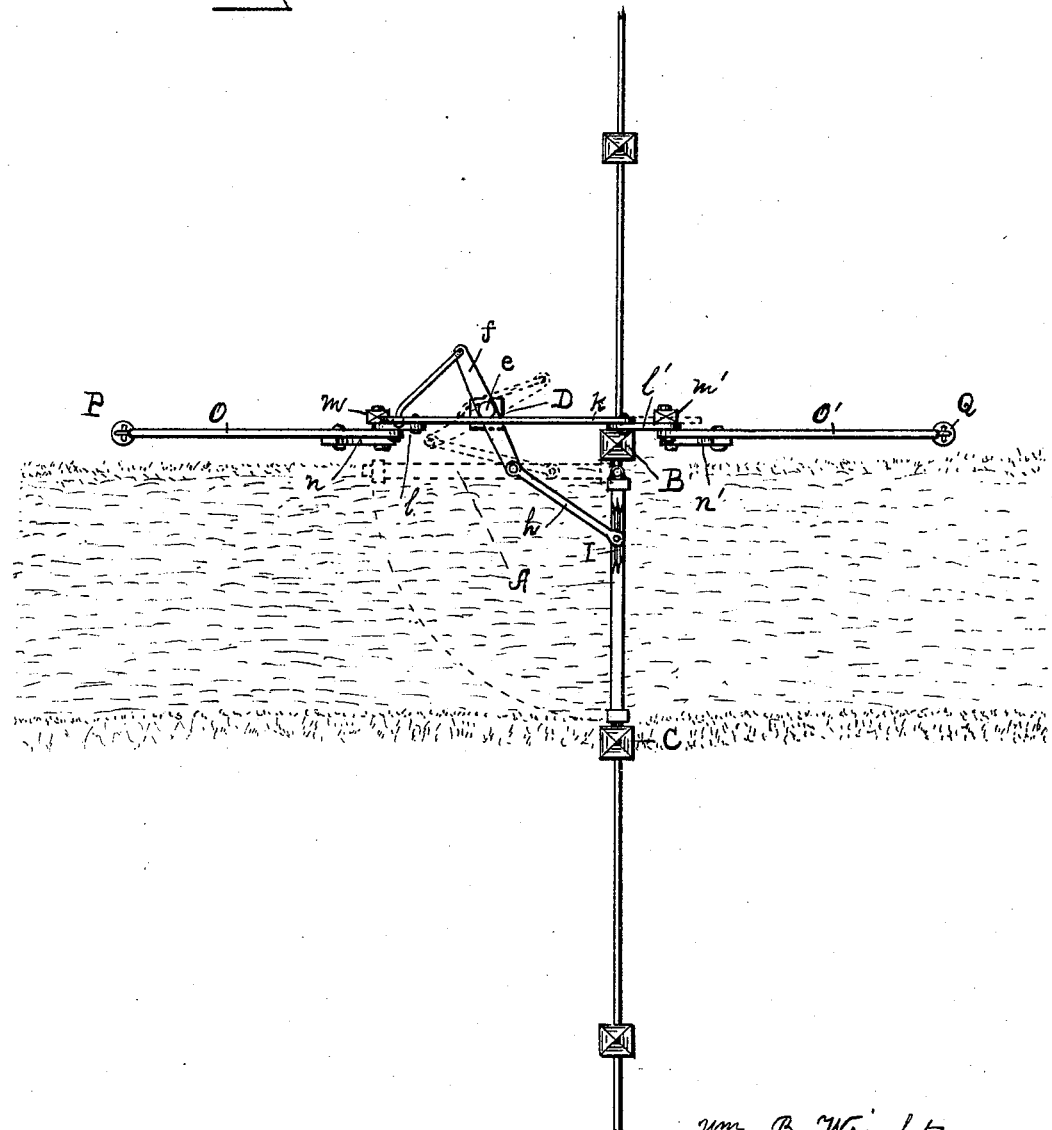
WITNESSES
H. N. Jenkins,
H. J. Wetmore
Wm. B. Wright,
INVENTOR,
By Stoddart & Co
Attorneys

UNITED STATES PATENT OFFICE.

WILLIAM B. WRIGHT, OF WARREN, INDIANA.

GATE OPERATING AND SECURING DEVICE.

SPECIFICATION forming part of Letters Patent No. 613,546, dated November 1, 1898.

Application filed April 27, 1897. Serial No. 634,133. (No model.)

*To all whom it may concern:*

Be it known that I, WILLIAM B. WRIGHT, a citizen of the United States, residing at Warren, in the county of Huntington and State of Indiana, have invented new and useful Improvements in Gate Operating and Securing Devices, of which the following is a specification.

This invention relates to that class of gates which are adapted to operate on hinges; and my improvements consist in certain combinations and arrangements of parts whereby the gate is operated and secured, as hereinafter fully specified.

The operating mechanism is constructed and arranged in connection with the gate in such manner that a person approaching or departing from the gate may operate the locking-bar and gate without having to dismount either from an animal or vehicle.

To more fully understand the nature of my invention, attention is called to the accompanying drawings, wherein—

Figure 1:
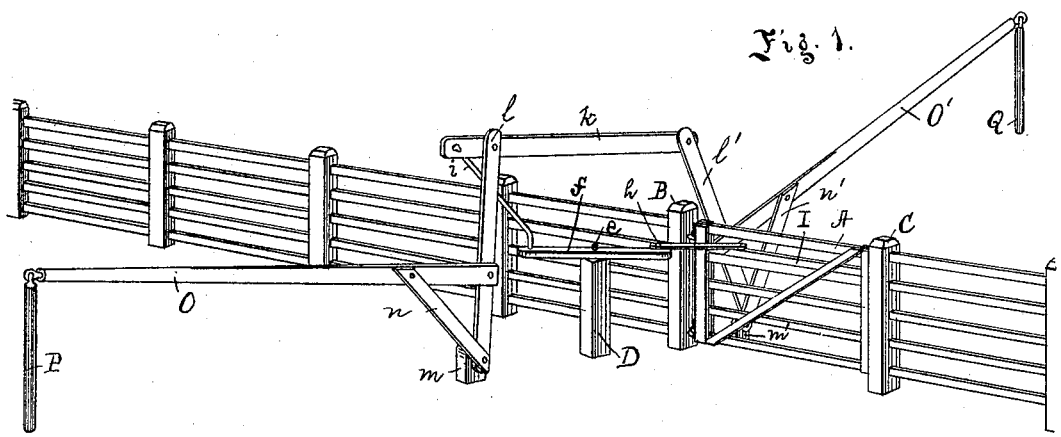
Figure 2:
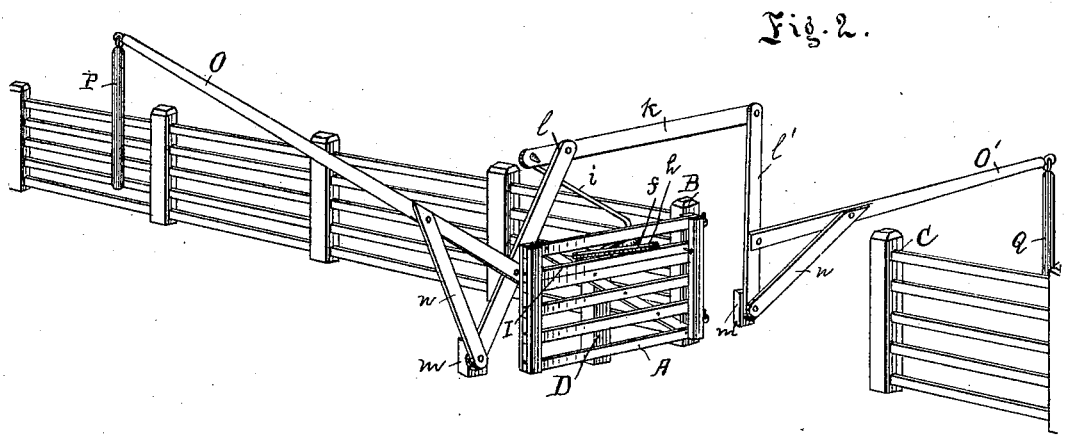

Figure 1 represents a perspective of an ordinary rail fence and gate with my improved means for operating and locking the gate, the said gate being shown in its closed position. Fig. 2 is a similar view of the fence with its gate as when open, the operating mechanism being shown in its relative positions. Fig. 3 is a plan or top view of the gate and operating devices.

The letter A designates the gate proper, and B the post to which it is hinged. C is the fence-post, against which the gate rests when closed. A third post or stake D is set between post B and stake $m$, as shown. This post is of less height than the gate and is provided at its top with a vertical pin $e$, on which is centrally pivoted a vibrating arm $f$, one end of which is connected by a rod $h$ with the locking-bar I, which is adapted to operate in guideways formed in or connected with the gate-stiles, so as to lock or unlock the gate, as occasion may require. The opposite end of the vibrating arm $f$ is connected by a rod $i$ with a beam $k$, which is pivotally connected with the upper ends of a pair of levers $l\ l'$. The lower ends of the said levers are in like manner pivoted to blocks or stakes $m\ m'$. The same pivots serve to support the lower ends of the braces $n\ n'$ of the operating-levers O O', which are connected at their inner ends with the levers $l\ l'$ and braces $n\ n'$, as clearly shown in the figures.

Handles P Q are suspended at the outer ends of operating-levers O O', so as to permit of their being operated as required.

The operating-levers when the gate is closed take one position, and the person approaching the gate to open it raises the lever next him if he is upon the side toward which the gate opens or depresses it if he is upon the opposite side. The levers can only be left in positions permitting these movements.

In the operation of the mechanism the locking-bar is first drawn back to allow the gate to be opened. The locking-bar remains in its rearward position until the gate is again closed, when through the action of the operating mechanism the said bar is pushed forward and the gate secured.

Having described my invention, what I claim as new, and desire to secure by Letters Patent, is—

The combination of a hinged gate having a sliding locking-bar, with a vibrating arm and a rod connecting said arm with the locking-bar, as described, and operating mechanism consisting of the pivoted levers $l\ l'$, the connecting-beam $k$, the rod $i$ connecting the said beam with the vibrating arm, the levers O, O', provided with braces $n$, $n'$, and handles P, Q, substantially as set forth.

In testimony whereof I affix my signature in presence of two witnesses.

WILLIAM B. WRIGHT.

Witnesses:
 CHARLES H. GOOD,
 WYNONA C. WOODS.